United States Patent [19]

Tasaka

[11] Patent Number: 4,912,566
[45] Date of Patent: Mar. 27, 1990

[54] IMAGE RECORDING APPARATUS WITH A VARIABLE MAGNIFICATION CAPABLE OF FINELY CHANGING AN IMAGE MAGNIFICATION

[75] Inventor: Kazutaka Tasaka, Kyoto, Japan

[73] Assignee: Dainippon Screen Mfg. Co., Ltd., Japan

[21] Appl. No.: 295,044

[22] Filed: Jan. 6, 1989

[30] Foreign Application Priority Data

Jan. 6, 1988 [JP] Japan ................................. 63-1005

[51] Int. Cl.⁴ ........................................... H04N 1/393
[52] U.S. Cl. ..................................... 358/451; 358/302
[58] Field of Search .......................... 358/287, 75, 302

[56] References Cited

U.S. PATENT DOCUMENTS

| | | | |
|---|---|---|---|
| 4,470,074 | 9/1984 | Yamada | 358/287 |
| 4,547,814 | 10/1985 | Hirosawa | 358/302 |
| 4,617,578 | 10/1986 | Nezu | 358/302 |

FOREIGN PATENT DOCUMENTS

| | | |
|---|---|---|
| 44-23651 | 10/1969 | Japan . |
| 54-65601 | 5/1979 | Japan . |
| 56-67277 | 6/1981 | Japan . |
| 61-161869 | 7/1986 | Japan . |
| 61-57749 | 12/1986 | Japan . |

Primary Examiner—Howard W. Britton
Attorney, Agent, or Firm—Ostrolenk, Faber, Gerb & Soffen

[57] ABSTRACT

An image recording apparatus with a variable magnification capability includes: a recording unit for recording an image by scanning a photosensitive material with a laser beam or the like; a circuit for generating an image recording signal for modulating the laser beam based on an image signal; an inputting unit for setting a desired magnification; and an adjusting circuit for adjusting the image recording signal based on the desired magnification. The adjusting circuit includes a circuit for setting the size of a standard image dot, and for changing the size, along the scanning direction of the beam, of a portion of the dots to obtain a desired degree of magnification/reduction of the image. The size of the standard dot is defined by a reference signal of a predetermined frequency. The size of the modified dots is defined by changing the frequency of the reference signal for the modified dots. The final image is comprised of a large number of the standard dots intermixed with a smaller number of the modified dots.

40 Claims, 11 Drawing Sheets

FIG.6A
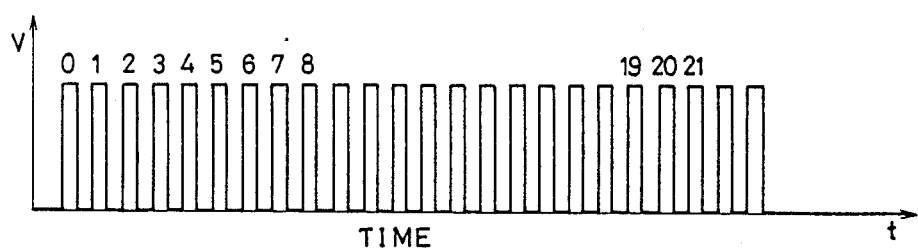
TIME
FIG.6B
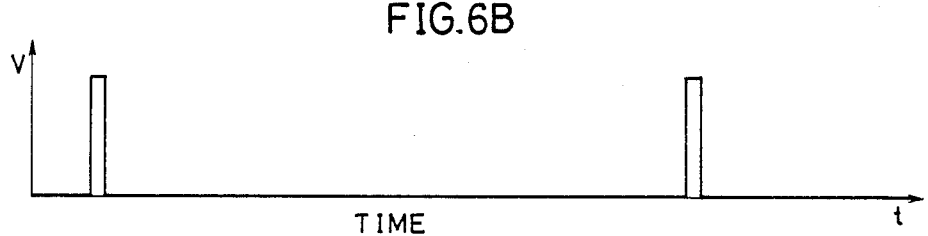
TIME
FIG.6C
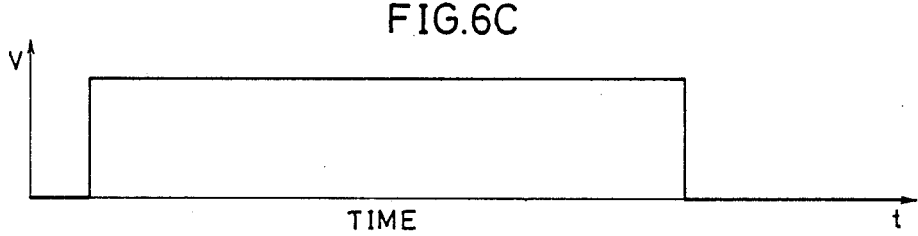
TIME
FIG.7A  FIG.7B
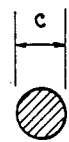
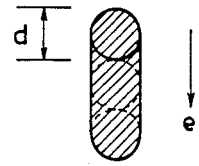

FIG.8(a)
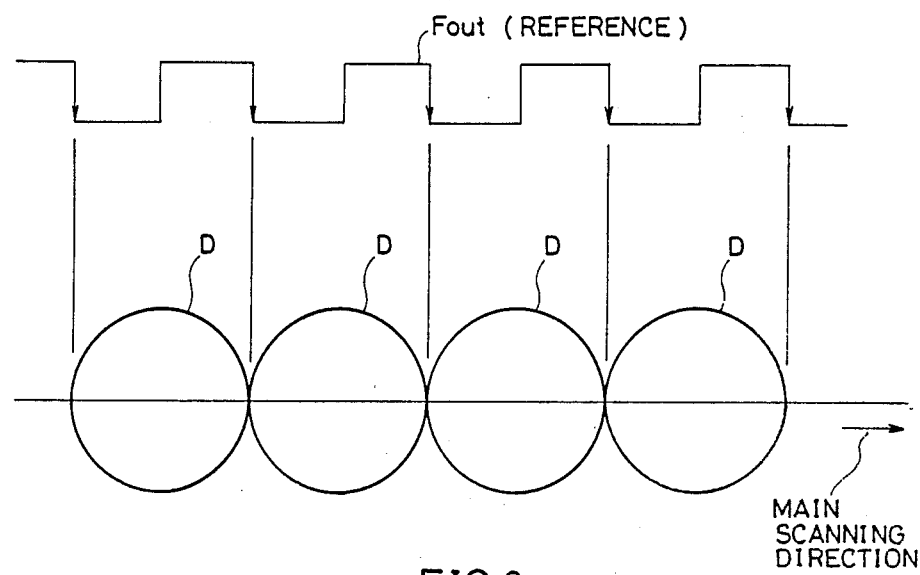
FIG.8(b)
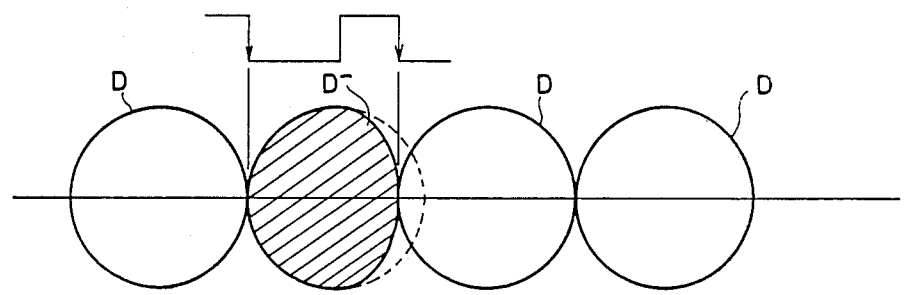
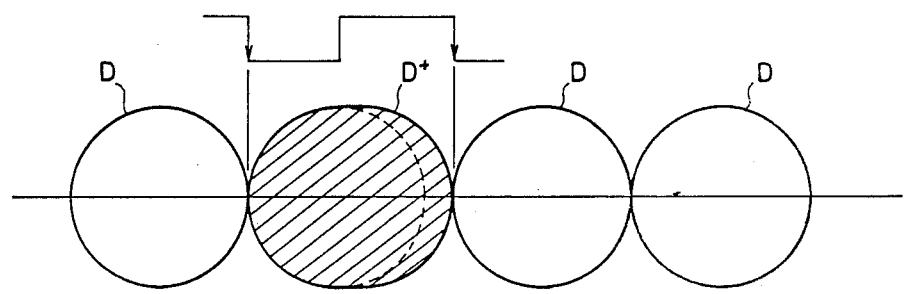
FIG.8(c)

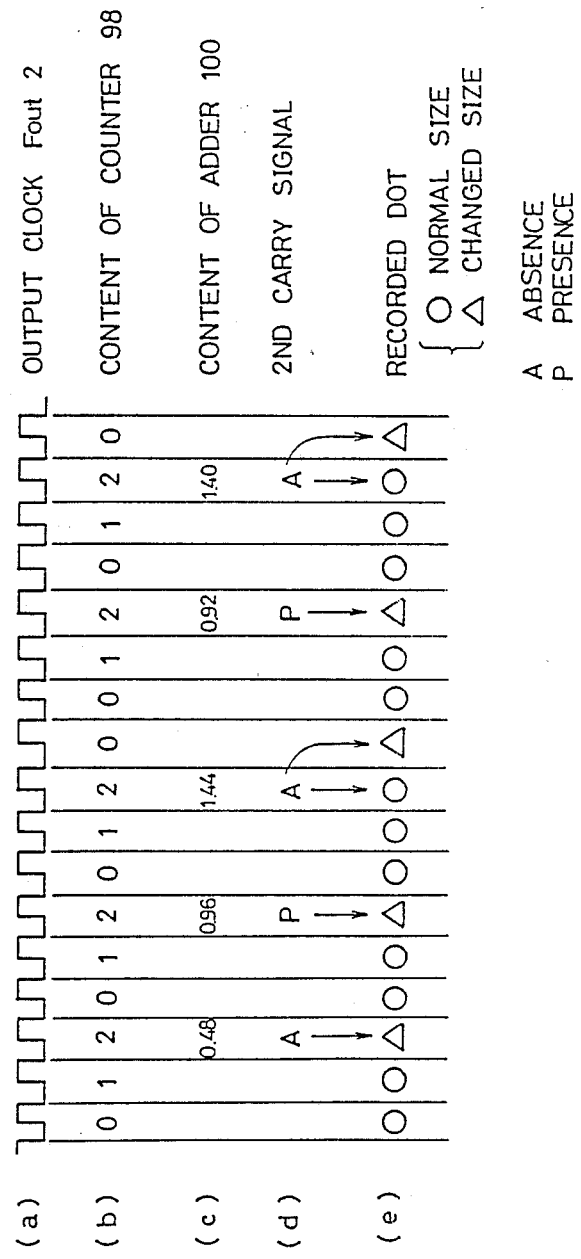

IMAGE RECORDING APPARATUS WITH A VARIABLE MAGNIFICATION CAPABLE OF FINELY CHANGING AN IMAGE MAGNIFICATION

BACKGROUND OF THE INVENTION

1. Field of the Invention

The present invention relates to a laser recording apparatus for forming an image by exposing a photoconductor to a laser beam for scanning and particularly it relates to an image recording apparatus with a variable magnification which changes a magnification of a binary image finely by gradual steps in the main scanning direction.

2. Description of the Background Art

Such a recording apparatus known in the prior art is for example a laser plotter of a cylindrical scanning type for use in art work of print connection patterns and the like.

An image recording unit of this laser plotter comprises, as shown in FIG. 1, a rotary drum 16 supporting a sheet of film 14, a main scanning drive device (not shown) for rotating the rotary drum 16 in the main scanning direction, an image forming head 20 having a laser beam oscillator, and a subscanning device (not shown) for moving the head 20 in a subscanning direction.

The image forming method of this laser plotter is as follows.

The main scanning drive device rotates the rotary drum 16. The image forming head 20 modulates on and off a laser beam in accordance with the image formation data. At the same time, the image forming head 20 moves in the subscanning direction. As a result, a line in the main scanning direction containing a series of dots is formed on the film 14, whereby a binary image as a set of lines in the main scanning direction is recorded.

Generally, various methods are known as methods of changing a size of an image to be recorded in such a scanning type recording apparatus. Among those, the following two methods are of special interest to the present invention. The first method is a method in which an output is provided through calculation for increasing or decreasing the number of recorded dots according to a variable magnification, based on data to be recorded. The second method is a method in which a basic scanning unit (a dot) for forming an image is expanded or reduced in a manner of changing the one dot's irradiation time of a laser beam. For this purpose, the wavelength of a clock signal serving as a reference for controlling the one dot's irradiation time of the laser beam is changed.

According to the first method (as disclosed for example in Japanese Patent Laying-Open No. 65601/1979), recording with a variable magnification is carried out by skipping some dots or adding interpolative dots according to the change of the magnification. However, in this method, part of the entire data to be outputted is skipped or some interpolative dots are added to the entire data to be outputted. In consequence, the definition of the output image is not preferable. In addition, it is impossible in this method to reduce or expand the image by an area smaller than one standard dot.

On the other hand, it is sometimes necessary to compensate for an error of the magnification dependent on a finishing precision of a rotary drum or to correct an error of a magnification caused by a difference in thickness of a film. In such cases, it is necessary to set a magnification change ratio by gradual steps, for example, of about ±0.001%. For those purposes, the above mentioned second method is adopted.

According to the second method, the size of one dot is expanded or reduced in the main scanning direction according to the magnification change ratio so that the size of the image can be changed. An apparatus of interest to the present invention is proposed in Japanese Patent Laying-Open No. 161869/1986. This apparatus is capable of adjusting the magnification change ratio with a precision of 0.001%. FIG. 2 is a block diagram showing the operation principle of the apparatus.

Referring to FIG. 2, the conventional variable magnification image recording apparatus comprises: an image recording unit 2 for scanning an image on photosensitive material such as a film and forming the image; a reference clock signal generator 5 for generating a reference clock signal; a high-frequency clock signal generator 3 connected to the reference clock signal generator 5, for generating a clock signal having a high frequency; a 1/L frequency divider 8 connected to the high-frequency clock signal generator 3, for applying frequency division to the high-frequency clock signal to generate an image forming clock signal; an image data storing unit 10 for storing image information and outputting an image formation data; and an image data processing unit 12 connected to the image data storing unit 10 and an output of the 1/L frequency divider 8, for outputting an image recording signal.

FIG. 1 is a detailed block diagram of the apparatus shown in FIG. 2. Referring to FIG. 1, the image recording unit 2 comprises: a rotary drum 16 for supporting a film 14; drum rotating means (not shown) for rotating the rotary drum in the main scanning direction; a rotary encoder 18 provided on a rotating shaft of the rotary drum 16, for outputting a reference clock signal in response to the rotation of the rotary drum 16; an image forming head 20 having a laser beam oscillator for forming an image composed of a plurality of dots on the film 14 by irradiation of a laser beam; and subscanning means (not shown) for moving the image forming head 20 in the subscanning direction.

The high-frequency clock signal generator 3 comprises a phase-locked loop (PLL) circuit 4 connected to the rotary encoder 18, for multiplying a frequency of the reference clock signal, and a higher-frequency clock signal generator 6, for generating a clock signal of a higher frequency than that of the output signal of the PLL circuit 4.

The PLL circuit 4 comprises a phase comparator 22, a low-pass filter 24, and a voltage control oscillator 26 connected successively with an output of the rotary encoder 18 and further comprises a 1K frequency divider 28 provided in a feedback loop from an output of the voltage control oscillator 26 to the phase comparator 22.

The higher-frequency clock signal generator 6 comprises a 1/m frequency divider 30 and a 1/n frequency divider 32, both connected to an output of the PLL circuit 4, second and third PLL circuits 34 and 36 connected to outputs of the frequency dividers 30 and 32, respectively, and a frequency mixer 38 connected to output of the third PLL circuit 36 and to the second PLL circuit 34.

The second PLL circuit 34 comprises a phase comparator 40, a low-pass filter 42 and a voltage control oscillator 44 connected successively with an output of the 1/m frequency divider 30, and a 1/M frequency divider 46 provided in a feedback loop from the frequency mixer 38 to the phase comparator 40. An output of the voltage control oscillator 44 is connected to the 1/L frequency divider 8 and the frequency mixer 38.

The third PLL circuit 36 comprises a phase comparator 48, a low-pass filter 50 and a voltage control oscillator 52 connected successively with an output of the 1/n frequency divider 32 and further comprises a 1/N frequency divider 54 provided in a feedback loop from the voltage control oscillator 52 to the phase comparator 48. Each of the characters m, n, K, L, M, and N represents a natural number and the represented numbers can be changed.

Referring to FIG. 1, operation of the conventional apparatus will be described. The rotary drum 16 is rotated by the drum rotating means in the main scanning direction. The rotary encoder 18 generates a signal having a frequency fi in response to the rotation of the rotary drum 16. The PLL circuit 4 multiplies the frequency of the reference clock signal inputted by the rotary encoder 18 by K and generates a clock signal having a frequency K·fi.

If it is not necessary to change the magnification finely by small steps, the output of the PLL circuit 4 may be connected directly to the 1/L frequency divider 8. In this case, the higher-frequency clock signal generator 6 is not necessary and the frequency fo of the clock signal outputted from the 1/L frequency divider 8 is as follows:

$$fo = K \cdot fi / L$$

where K and L are both natural numbers. It is known that in order to accurately adjust the frequency fo with a change amount of about 0.001%, K needs to be about $10^5$. However, if K is $10^5$ and fi is about 100 kHz, the frequency of the clock signal outputted by the PLL circuit 4 becomes too high, causing the operation of the PLL circuit 4 to be unstable. Therefore, it is known that if the output of the PLL circuit 4 is connected directly to the 1/L frequency divider 8, a magnification change ratio cannot be set with the change amount of about 0.001%.

The higher-frequency clock signal generator 6 outputs a signal having a high-frequency necessary for obtaining a desired magnification change ratio while the respective frequencies of the output clock signals of the PLL circuits 4, 34 and 36 are prevented from being too high. The 1/L frequency divider 8 divides, by L, the frequency of the signal outputted from the higher-frequency clock signal generator 6 and outputs an image forming clock signal having the frequency fo. The image data processing unit 12 outputs an image recording signal having two values dependent on image data, synchronizing the image forming signal inputted from the image data storing unit 10 with the image forming clock signal. The image forming head 20 receives the image recording signal and modulates on and off a laser beam, so that an image composed of dots is recorded on the film 14. The film 14 rotates together with the rotary drum 16 in the main scanning direction. The image forming head 20 is moved with a high precision in the subscanning direction by the subscanning means. Thus, the binary image is formed on the film 14.

The operation of the higher-frequency clock signal generator 6 will be described in more detail. The 1/m frequency divider 30 outputs a clock signal having a frequency $f1 = K \cdot fi/m$. The 1/n frequency divider 32 outputs a clock signal having a frequency $f2 = K \cdot fi/n$. The PLL circuit 36 outputs a clock signal having a frequency $fo2 = N \cdot K \cdot fi/n$. The PLL circuit 34 has an output clock signal of frequency fo1. The frequency mixer 38 outputs a clock signal having a frequency $f3 = fo1 - fo2$ and supplies it to the 1/M frequency divider 46. A clock signal outputted from the 1/M frequency divider 46 has a frequency f3/M.

The PLL circuit 34 adjusts the output frequency fo1 so that the frequencies of the two signals inputted to the phase comparator 40 may be equal. Accordingly, the following equation is obtained.

$$\begin{aligned} f1 &= f3/M \\ &= (fo1 - fo2)/M \end{aligned}$$

As a result, the following equation is established.

$$\begin{aligned} fo1 &= M \cdot f1 + fo2 \\ &= K \cdot (M/m + N/n) \cdot fi \end{aligned}$$

Consequently, the frequency fo of the synchronizing signal outputted from the 1/L frequency divider 8 is as follows.

$$fo = K \cdot (M/m + N/n) \cdot fi / L$$

The frequency dividing factor of the 1/M frequency divider 46 is changed from M to M+1 and the frequency dividing factor of the 1/N frequency divider 54 is changed from N to N−1 at the same time. At this time, the frequency fo of the image forming clock signal is changed with a unit change ratio:

$$\delta = (n - m)/(nM + mN)$$

Particularly, in view of stable operation of the PLL circuits 34 and 36, the numbers m, n, M and N are selected to be about $10^2$ to $10^3$. With a condition of $1 \leq n - m \leq 10$, the ratio $\delta$ can be selected to be about $10^{-5}$. More specifically, the frequency change ratio can be adjusted by steps of $10^{-5}$. In other words, it can be set with a unit of 0.001%.

In the image recording unit 2, the laser beam is modulated on and off in response to the image recording signal, more particularly, synchronously with the image forming clock signal because the image recording signal is synchronized with the image forming signal. Accordingly, the size of the standard dot in the main scanning direction is proportional to the reciprocal number of the frequency (more particularly, the wavelength) of the image forming clock signal. Since the frequency of the image forming clock signal can be adjusted with a small change amount, the size of the standard dot for image formation can be also adjusted with a small change amount. In this case, the sizes of all the dots contained in an image are equal and the size in the main scanning direction is changed exactly by an amount corresponding to the change of the magnification, compared with the dot size in the case of the magnification of 1.

However, the conventional image recording apparatus with a variable magnification has the below described disadvantages. One of the disadvantages is that operation for determining conditions for obtaining a desired magnification is complicated. Variables to be set are at least as many as six. Therefore, in general, there is no effective method for defining the most suitable combination of the variables. As a result, it is necessary to take account of a large number of combinations of the variables by setting conditions such as the frequency dividing factors of the respective frequency dividers.

Another disadvantage is the complicated work for setting the circuits to obtain a desired magnification. The elements which need to be adjusted for obtaining the desired magnification are dispersed in the circuits. Therefore, the circuit adjusting work for obtaining the desired magnification is troublesome.

A further disadvantage is that the circuit construction is complicated. The circuitry has many components. In addition, a desired magnification cannot be obtained unless all the components operate correctly. Thus, the maintenance efficiency of the apparatus would be likely to be lowered.

SUMMARY OF THE INVENTION

Therefore, the object of the present invention is to solve the above mentioned problems.

An image recording apparatus with a variable magnification according to the present invention is an apparatus which carries out scanning on photosensitive material in a main scanning direction and in a subscanning direction intersecting with the main scanning direction and forms an image on the photosensitive material based on image data prepared in advance, and this apparatus includes: an image recording unit for supporting the photosensitive material and forming the image on the photosensitive material based on the image data; an image recording signal generating unit connected to the image recording unit, for storing the image data and generating an image recording signal for forming the image based on the image data; a magnification signal generating unit for generating a predetermined magnification signal to form the image with a desired magnification; an image recording signal adjusting unit connected to the image recording signal generating unit and the magnification signal generating unit, for adjusting the image recording signal in response to the magnification signal, the image being formed by a plurality of dots, the image recording signal adjusting unit including a standard dot size defining unit for defining the size of each of the plurality of dots in the main scanning direction, and a dot size changing unit for defining the sizes of part of the plurality of dots in the main scanning direction in response to the magnification signal, thereby to adjust the size of the image with the desired magnification.

The image recording apparatus with a variable magnification is constructed as described above. Accordingly, the image is formed by a large number of dots of a standard size, and dots of sizes different from the standard size mixed with the dots of the standard size. The sizes of the dots different from the standard size can be changed by small steps within a range not causing any inconvenience to the circuit. In addition, the numbers of dots of sizes different from the standard size can be made small compared with the total number of dots in the main scanning direction. Further, the numbers of dots of sizes different from the standard size can be precisely adjusted stepwise. As a result, the image recording apparatus with a variable magnification is capable of changing the magnification of the image finely by small steps.

According to a preferred embodiment of the invention, an image recording apparatus with a variable magnification is an image recording apparatus with a variable magnification for forming an image on a photosensitive material based on image data prepared in advance, by scanning on the photosensitive material in a main scanning direction and in a subscanning direction intersecting with the main scanning direction, comprising: a reference clock signal generating unit for generating a reference clock signal corresponding t displacement in space on the side of the photosensitive material; a multiplying unit for multiplying the reference clock signal; a frequency divider for frequency-dividing the multiplied clock signal; an image recording unit for holding the photosensitive material and forming the image on the photosensitive material based on the image data; an image recording signal generating unit connected to the image recording unit, for storing the image data and generating an image recording signal for the formation of the image based on the image data; a magnification input unit for inputting a desired magnification for forming the image with a desired magnification change; an operation unit connected to the magnification input unit, for processing magnification data for changing the frequency division factor of the frequency divider based on the magnification; and a frequency division factor change controlling unit for controlling change of a predetermined frequency division factor applied to the frequency divider based on the magnification data during the scanning. The magnification data includes a numerical value having an integer part and a decimal part and the frequency division factor change controlling unit includes an integer part processing unit for processing the integer part, a decimal part processing unit for processing the decimal part, a control unit for controlling the integer part processing unit and the decimal part processing unit, and a storing unit connected to the control unit for storing a predetermined frequency division factor and supplying the predetermined frequency division factor to the frequency divider.

The predetermined frequency division factor is any of a plurality of different frequency division factors and the plurality of different frequency division factors include a predetermined first frequency division factor, a second frequency division factor combined with the first frequency division factor, and a third frequency division factor different from the second frequency division factor and combined with the first frequency division factor. The magnification includes an expansion magnification for expanding an image or a reduction magnification for reducing the image and the operation unit selects between the first frequency division factor and the second frequency division factor corresponding to the expansion magnification and selects between the first frequency division factor and the third frequency division factor corresponding to the reduction magnification.

An image recording apparatus with a variable magnification is constructed as described above. Therefore, the frequency division change control unit changes the frequency division factor of the frequency divider during scanning of the image. Since the size of each dot forming the image in the main scanning direction is determined by the frequency division factor, the image can be expanded or reduced. The operation unit sets a combination of the predetermined first and second frequency division factors based on the desired magnification and stores them in the storing unit. At the same time, the operation unit defines a ratio of the number of frequency divisions by the first frequency division factor and that by the second frequency division factor to obtain a desired magnification. The control unit selects either the first frequency division factor or the second frequency division factor based on the above mentioned ratio. Thus, the magnification of the image is changed by changing the frequency division factor during the main scanning. Therefore, a signal having a particularly high frequency is not needed. Accordingly, the apparatus can be made to have a simple construction. In addition, by only changing the frequency division factor of one frequency divider, the magnification of the image can be finely changed easily. Furthermore, by selecting the frequency division factor from among three values, the image can be expanded or reduced. In addition, in the respective cases of expansion and reduction, a desired magnification can be obtained by only changing the frequency division value to two different values. Thus, the conditions of magnification change can be easily set.

Thus, it is possible to provide an image recording apparatus with a variable magnification having a simple construction and capable of changing the magnification of an image finely by small steps with simple conditions.

The foregoing and other objects, features, aspects and advantages of the present invention will become more apparent from the following detailed description of the present invention when taken in conjunction with the accompanying drawings.

DESCRIPTION OF THE DRAWINGS

FIGS. 6A to 6C are timing charts representing relations of the clock signals.

FIGS. 7A to 7B are typical illustrations showing manners of formation of dots.

FIG. 8 is an illustration showing relations between an image forming clock signal and a dot size.

FIG. 10 is an illustration for explaining operation conditions of the embodiment of the invention.

DESCRIPTION OF THE PREFERRED EMBODIMENTS

Figure 1:
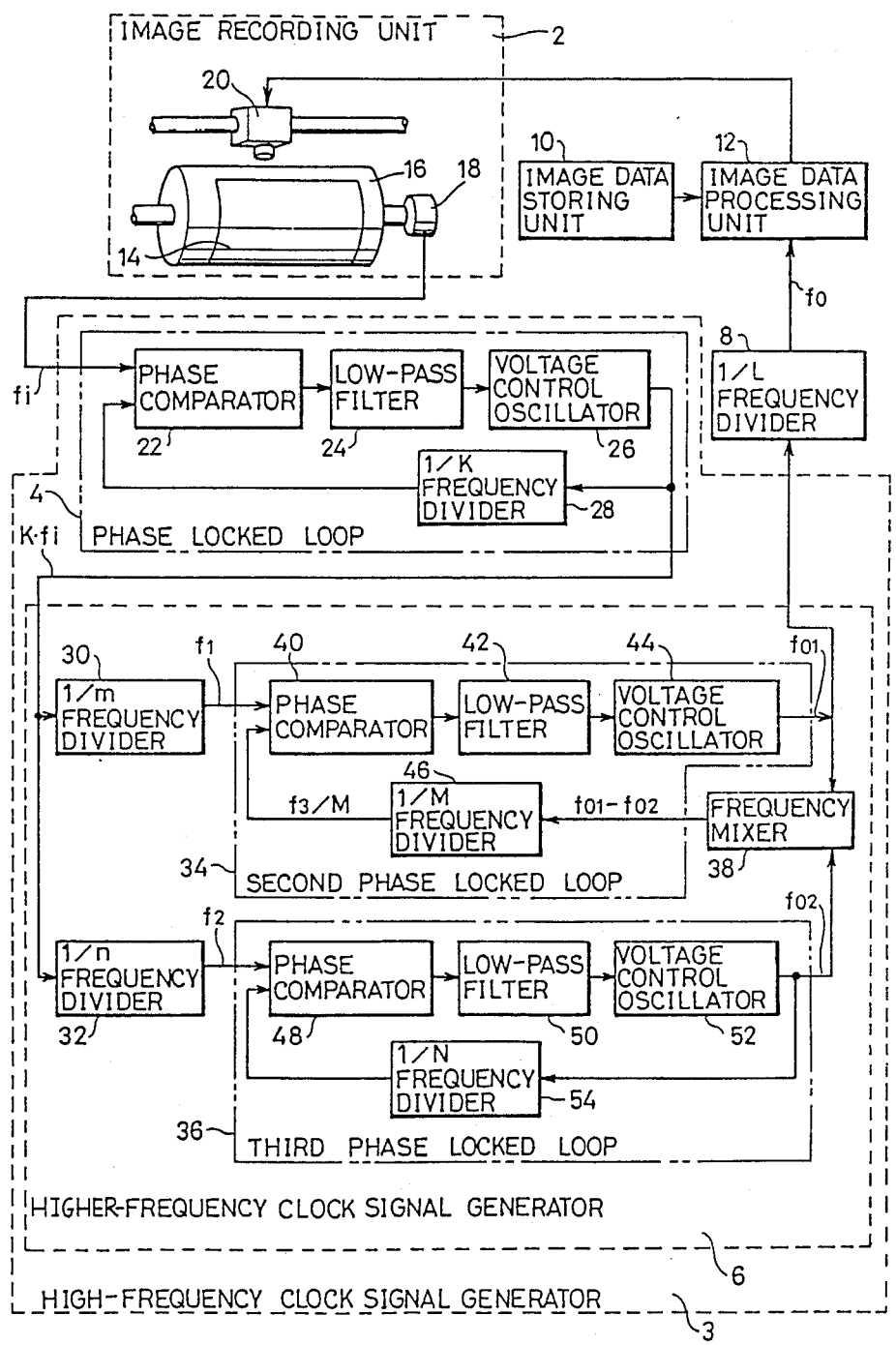
FIG. 1 is a block diagram of a conventional image recording apparatus.
Figure 2:
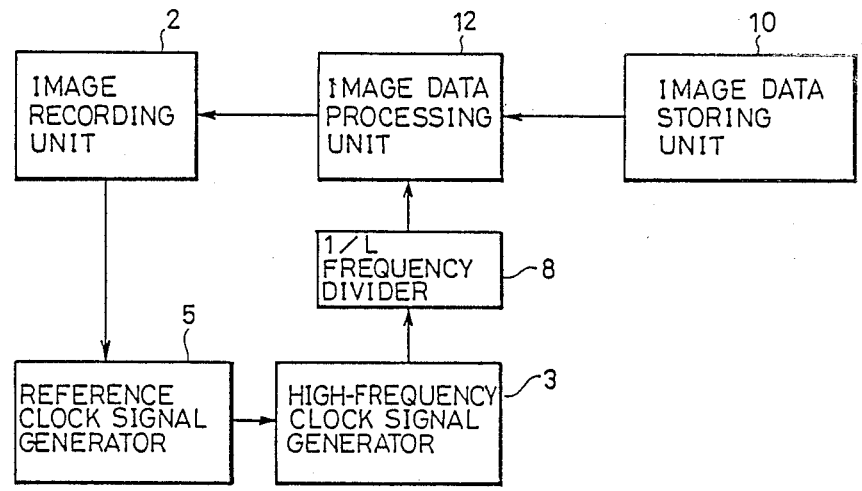
FIG. 2 is a block diagram showing the operation principle of the conventional image recording apparatus.
Figure 3:
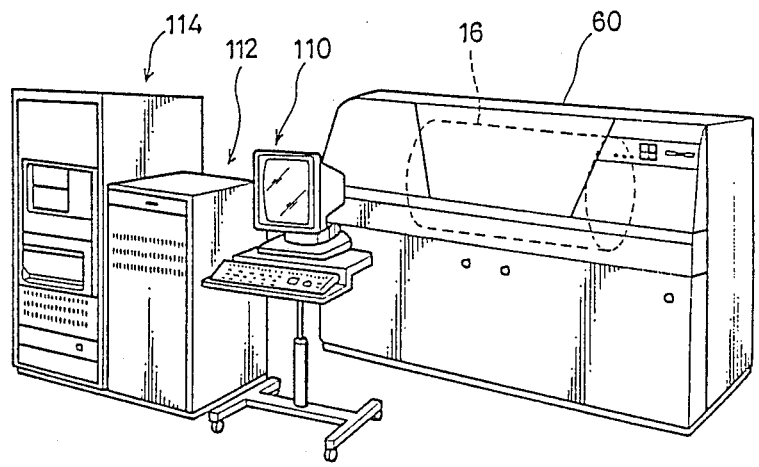
FIG. 3 is a perspective view showing an appearance of an example of an image recording apparatus.

FIG. 3 is a perspective view showing an appearance of an example of an image recording apparatus with a variable magnification according to the present invention. Referring to FIG. 3, the image recording apparatus with a variable magnification comprises: a console unit 110 for inputting a changed magnification for example; a data generating unit 112 for operating and processing image formation data inputted through a recording medium such as a magnetic tape and data inputted through the console unit 110 or the like and outputting vector image formation data; an image processor unit 114 including an image processing unit for outputting an image recording signal synchronously with the image forming clock signal converting the vector image data from the data generating unit 112 into the image recording signal; and an image recording unit 60 for forming a binary image of a plurality of dots on a photosensitive material such as a sheet of film by modulating on and off a laser beam by an audio optical modulator for example, in response to the image recording signal, while rotating a recording drum 16 on which the film or other photosensitive material is secured.

Figure 4:
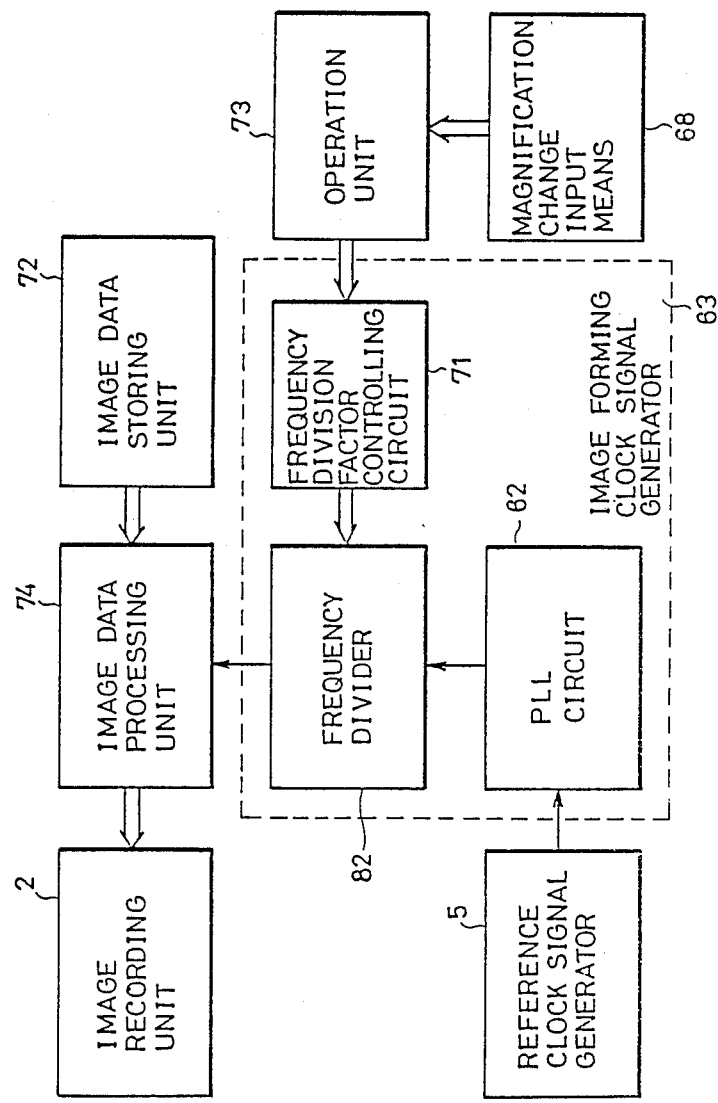
FIG. 4 is a schematic block diagram of an image recording apparatus according to the present invention.

FIG. 4 is a schematic block diagram showing an example of an image recording apparatus according to the present invention. Referring to FIG. 4, the image recording apparatus according to the present invention comprises: an image recording unit 2 for holding the photosensitive material and forming an image on the photosensitive material based on an image recording signal; an image data storing unit 72 for storing image data provided in advance; an image data processing unit 74 for processing an image recording signal for image formation based on the image data; magnification change input means 68 for inputting a predetermined magnification signal to form an image with a desired magnification change ratio; an operation unit 73 for evaluating a ratio for changing a frequency division factor according to the inputted magnification change ratio; a frequency division factor change controlling circuit 71 for controlling change of the frequency division factor according to the ratio; a reference clock signal generator 5 for generating a reference clock signal; a PLL circuit 62 for multiplying the reference clock signal; and a frequency divider 82 for frequency-dividing the clock signal multiplied by the PLL circuit 62. The PLL circuit 62, frequency divider 82 and the frequency division factor change controlling circuit 71 form an image forming clock signal generator 63. The frequency division factor of the frequency divider 82 is selected between a normal frequency division factor and a frequency division factor for magnification change with a ratio according to the inputted magnification to be hanged, whereby dots of the standard size and dots of the changed size are selected for image formation. Thus, the size of the image is adjusted to a desired magnification.

Figure 5:
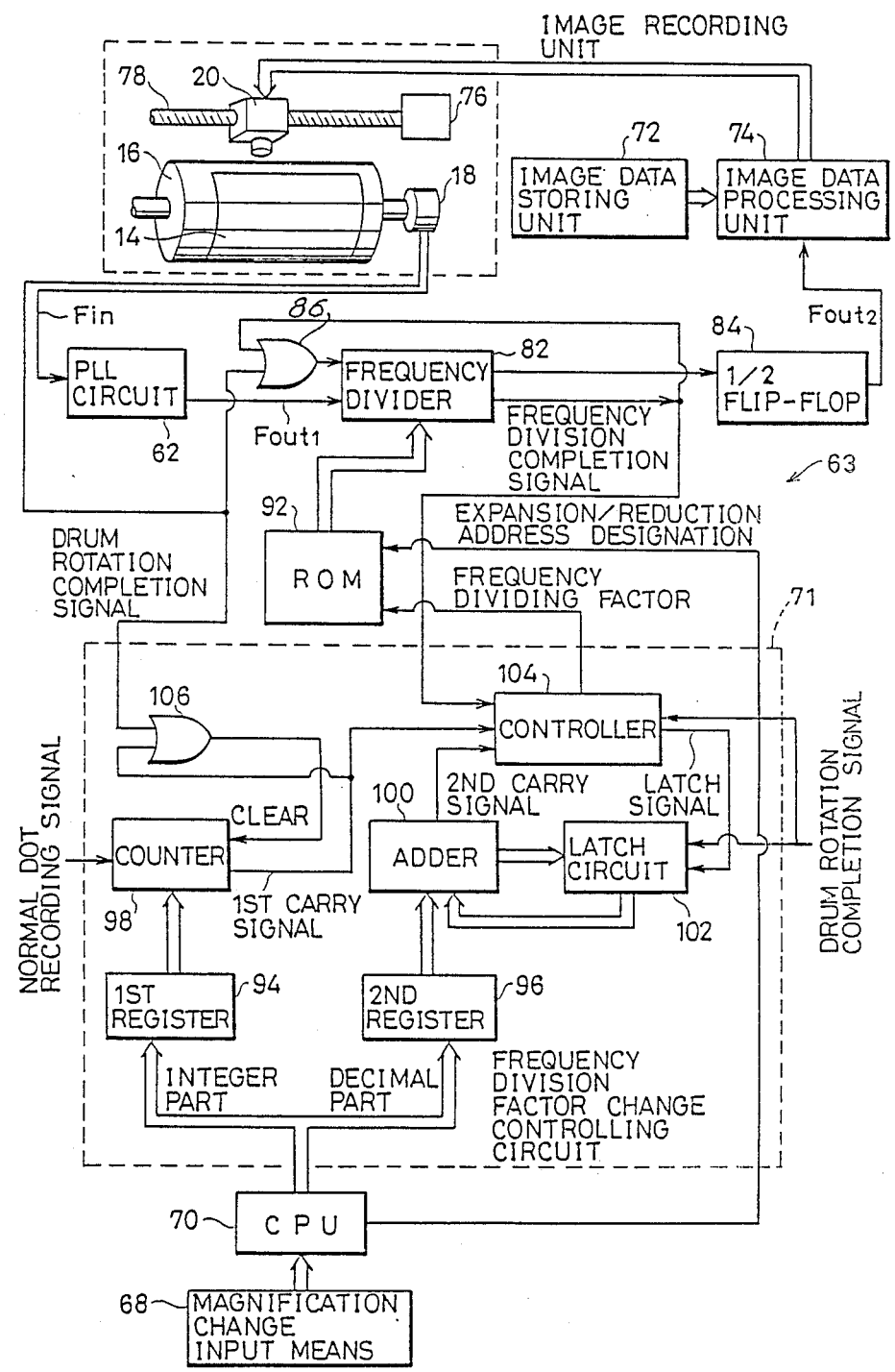
FIG. 5 is a detail block diagram of an image recording apparatus according to an embodiment of the invention.

FIG. 5 is a more detailed block diagram of the apparatus shown in FIG. 4. Referring to FIG. 5, the PLL circuit 62 multiplies the frequency of a clock signal $F_{in}$ outputted from the rotary encoder 18 as a reference clock signal in response to the rotation of the recording drum 16, so that a clock signal $F_{out1}$ is obtained. The frequency divider 82 frequency-divides the clock signal $F_{out1}$ and the frequency division factors are set in advance in the ROM 92. A flip-flop circuit 84 frequency-divides the clock signal outputted from the frequency divider 82 to ½ in a reference state where the magnification is not changed and the duty ratio is set to 50%.

The flip-flop circuit 84 outputs an output clock signal $F_{out2}$, which is used as a clock signal, namely, an image forming clock signal for defining image forming timing of the laser recording beam and the size in the scanning direction. A percent value for reduction or expansion compared with the standard size is inputted by the operator into the magnification change input means 68.

Based on the inputted percent value, the CPU 70, as the operation means, calculates the interval of dots of the standard size for which a dot of a changed magnification is mixed. The result of the calculation is divided into an integer part and a decimal part. The integer part is inputted to the first register 94 and the decimal part is inputted to the second register 96.

A counter 98 counts by +1 each time a dot of the standard size is recorded and when the count value reaches the value indicated by the first register 94, the counter 98 generates a first carry signal.

An adder 100 adds the value inputted to the second register 96 each time a latch signal is inputted to the latch circuit 102 and generates a second carry signal when a carry of more than "1" occurs. A controller 104 sets a frequency dividing factor used as a reference to be supplied to the frequency divider 82. The reference numerals 86 and 106 indicate OR circuits.

The image recording unit 2 comprises a rotary drum 16 on which a sheet of film 14 is held, a rotary encoder 18 provided on a rotating shaft of the rotary drum 16, an image forming head 20 having a laser beam oscillator, a transport motor 76 and a screw shaft 78 as subscanning means for moving the image forming head 20 in a subscanning direction.

Referring to FIGS. 5 and 5A to 5C, operation of the image recording with a variable magnification of this apparatus will be described. This embodiment is disclosed by using specific numerical values for the purpose of facilitating the understanding of the invention. However, the below indicated embodiment should not be considered to be limiting.

Figure 5A:
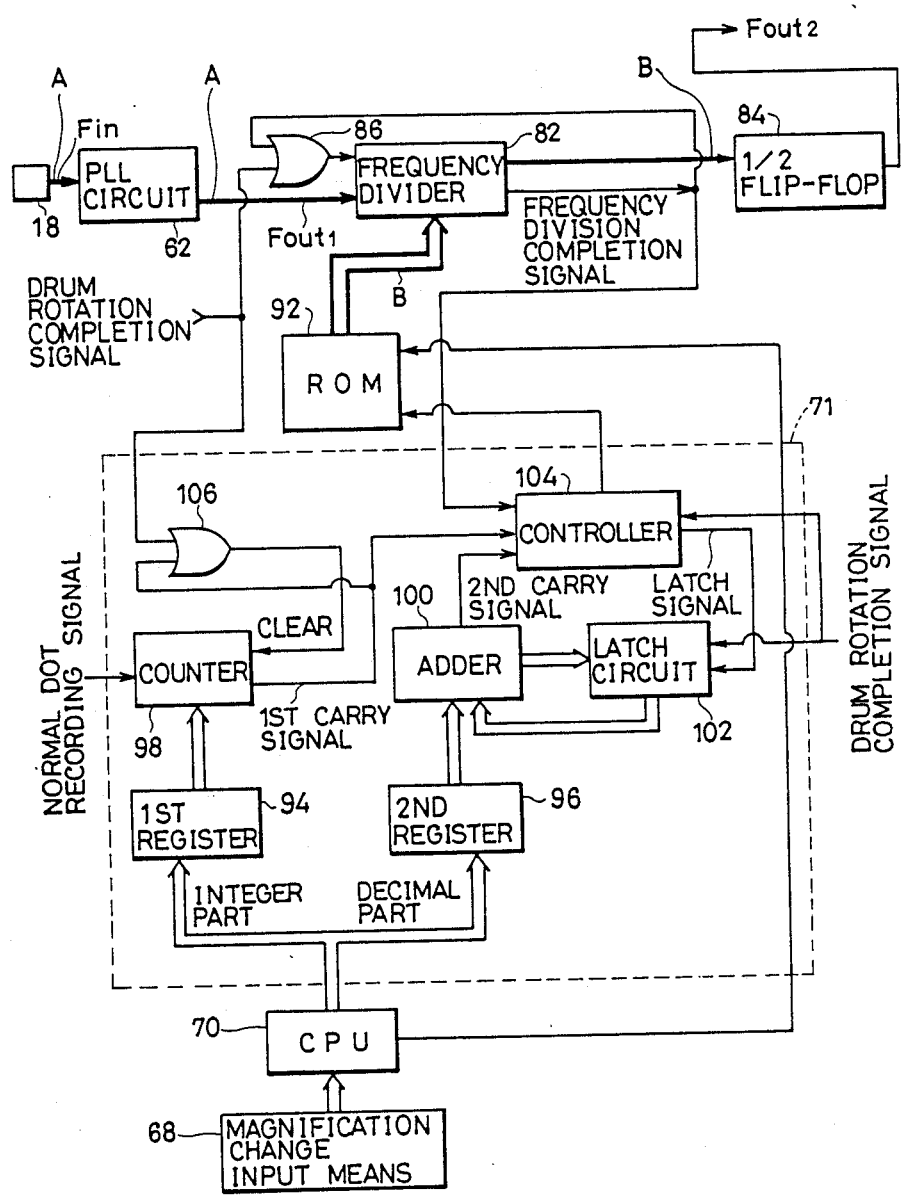
FIGS. 5A to 5C are block diagrams of the main portion of an image recording apparatus according to an embodiment of the invention.

As the line A in FIG. 5A shows, the rotary encoder 18 which rotates synchronously with the rotary drum 16 outputs a clock signal $F_{in}$ (in this embodiment, $F_{in}$ =780 kHz). The clock signal $F_{in}$ is multiplied by 40 by the PLL circuit 62, whereby a clock signal $F_{out1}$ is obtained. In other words, $F_{out1}$=31.2 MHz. The clock signal $F_{out1}$ is frequency-divided to 1/20 by the frequency divider 82 in a standard mode where the magnification is not changed (shown by the line B in FIG. 5A). The clock signal divided by the frequency divider 82 is further frequency-divided to ½ by the flip-flop circuit 84. As a result, an image forming clock signal $F_{out2}$ corresponding to a standard dot is outputted. The flip-flop circuit 84 is adapted so that the image forming clock signal $F_{out2}$ is equal to pulses of a duty ratio 50% in the standard state, in order to carry out a stable circuit operation of the apparatus. However, if the frequency division factor of the frequency divider 82 is set to 40, similar stable operation can be carried out without the flip-flop circuit 84.

FIGS. 6A to 6C are timing charts representing output pulses of the respective elements in a period in which the clock signal $F_{out1}$ becomes the image forming clock signal $F_{out2}$.

FIG. 6A represents pulses of the multiplied clock signal outputted from the PLL circuit 62. This clock signal is frequency-divided by the frequency divider 82, so as to be a pulse signal as shown in FIG. 6B. The frequency of this signal is 1/20 of the frequency of the reference clock signal when the frequency division factor of the frequency divider 82 is 20. This clock signal is transformed into a clock signal shown in FIG. 6C by the flip-flop circuit 84. The flip-flop circuit 84 switches from either high level or low level of the output signal to the other level each time it detects a clock pulse shown in FIG. 6B. As a result, the signal shown in FIG. 6B is further frequency-divided to ½. More specifically, the image forming clock signal $F_{out2}$ outputted from the flip-flop circuit 84 has a frequency equal to 1/40 of the frequency of $F_{out1}$ in the standard state and its duty ratio is 50%.

FIGS. 7A and 7B are illustrations of dots produced by a laser recording beam. FIG. 7A represents a spot of the laser recording beam when the main scanning and the subscanning are both stopped. The character c indicates a spot diameter of the beam. FIG. 7B represents a state in which scanning by the laser recording beam is carried out in the main scanning direction (the direction e) while the recording drum is rotated. FIG. 7B shows an image formed by three clocks of the output clock signal, where d indicates a size of one dot.

The spot diameter c of the laser recording beam does not change unless the optical system is operated. However, the dot size d can be changed if the wavelength of one clock of the image forming clock signal is changed.

FIG. 8 is a graph showing a principle of change of the dot size d. Referring to FIG. 8, it is assumed that B (an integer) is the standard value of the frequency divider for forming the image forming clock signal $F_{out2}$) for determining image formation timing of the laser recording beam. In this case, an image forming clock serving as a reference clock corresponds to a recording dot (D) of a standard size as shown in (a) of FIG. 8. When the frequency division factor for the second dot is changed from B to B-N (N being an integer satisfying the condition of N<B), as shown in (b) of FIG. 8, only the portion of the output clock signal corresponding to this change has a larger frequency. As a result, the clock wavelength of the image forming clock signal becomes small and a dot (D$^-$) of the changed magnification having a smaller dot size is recorded.

In the case of expanding the dot size, the frequency division factor is hanged from B to B+N. As a result, as shown in (c) of FIG. 8, the output clock signal has a smaller frequency in only the portion corresponding to this change. Thus, the clock wavelength of the image forming clock signal becomes large and a dot (D$^+$) of the changed magnification having a larger dot size is recorded.

Figure 5B:
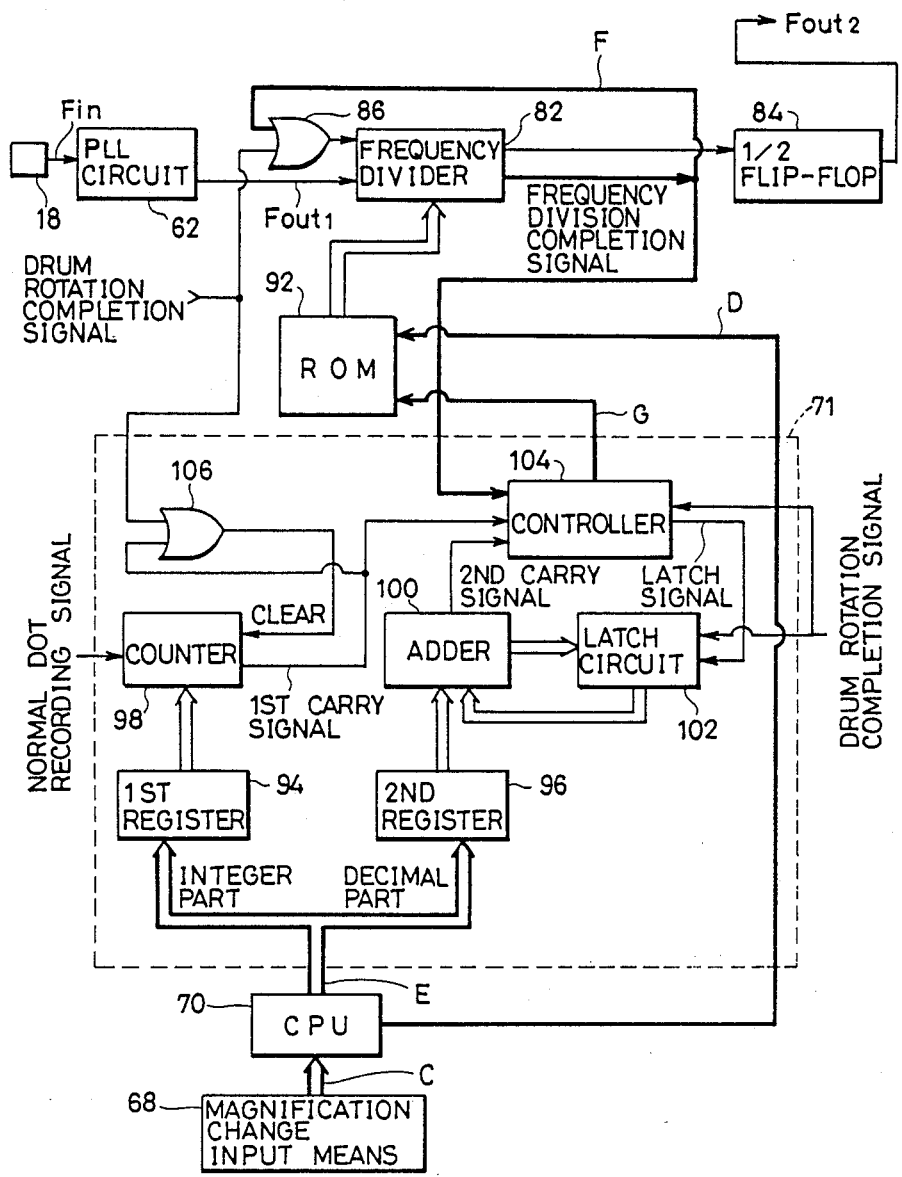

Referring to FIG. 5B, the magnification change input means 68 receives from an operator a percent value for reduction or expansion compared with the normal size. Based on the inputted percent value, the CPU 70 preforms calculations to determine the interval of dots of the normal size for which a dot having a changed magnification is mixed (shown by the thick arrow C). At this time, an address of the frequency division factor in the ROM 92 is set dependent on whether reduction or expansion is to be effected (shown by the line D).

In the following description, the example using specific numerical values is indicated in parentheses. It is to be noted, however, that a particularly large magnification change ratio is adopted in this example for convenience of explanation.

It is assumed that the spot diameter in the standard condition of the beam is M μm (=10 μm), that the maximum size for recording, namely, the length in the main scanning direction is N μm (650 mm=650000 μm), and that the maximum number of dots to be recorded in the length in the main scanning direction is L (=650000/10=65000). The magnification change ratio is 100±K % (K=±0.7184%). Consequently, the recording size to be increased or decreased is N·K/100 μm (=4669.6 μm).

It is further assumed that the reference frequency dividing factor "20" of the frequency divider 82 is changed to "19" and "21" for reduction and expansion, respectively. The wavelength of the divided clock signal outputted by the frequency divider 82 changes by one pulse with respect to 20 pulses of the clock signal $F_{out1}$. On the other hand, one dot is recorded by two clock pulses of the clock signal outputted by frequency divider 82. This is because the clock signal outputted by the frequency divider 82 is further frequency-divided by the flip-flop 84. One cycle of the clock pulse of the image forming clock $F_{out2}$ is equivalent to two cycles of the clock signal outputted by the frequency divider 82. The first pulse is gained by the frequency-division with the factor "20", while the latter is gained with the factor "19" or "21". Consequently, the wavelength of the output clock signal $F_{out2}$ changes by one pulse with respect to 40 pulses of the clock signal $F_{out1}$. In other words, the size of a correction dot is larger or smaller than that of a standard dot by M/40 $\mu m = \pm 0.25$ $\mu m$).

Accordingly, in order to obtain a predetermined changed magnification, the number of correction dots indicated by the below equation are mixed in L (=65000) dots.

$$(N \cdot K \cdot 100) \div (M/40) = 40NK/100M$$

In the specific example, the number is as follows:

$$(650,000 \times 0.7184 \times 100) \div (10/40) = 18,678.4$$

The interval for mixing each correction dot is indicated as below. In other words, the below indicated number of standard dots exist for each interval.

$$L \div (40NK/100L) = 100LM/40NK$$

It is assumed that the correction dots are mixed with the standard ones evenly during main scanning. More specifically, recording of an image is effected by using a correction dot for (100LM/40NK) − 1 (=2.48) dots of the standard size.

The CPU 70 performs the above described calculation. As the thick arrow E in FIG. 5B indicates, the integer part and the decimal part of the information as to the number of dots of the standard size for which a correction dot is to be mixed are stored in the first and the second registers 94 and 96, respectively.

The frequency divider 82 counts the clock pulses of the inputted clock signal $F_{out1}$ and outputs a clock pulse signal when the number of pulses is equal to the frequency division factor set in the ROM 92. The frequency divider 82 outputs a frequency division completion signal for each end of a frequency division and it is cleared by the frequency division end signal through the OR circuit 86 (shown by the line F in FIG. 5B).

The controller 104 selects a frequency division factor each time a frequency division completion signal is detected, and changes an address in the ROM 92, if it is required (shown by the line G in FIG. 5B).

Figure 5C:
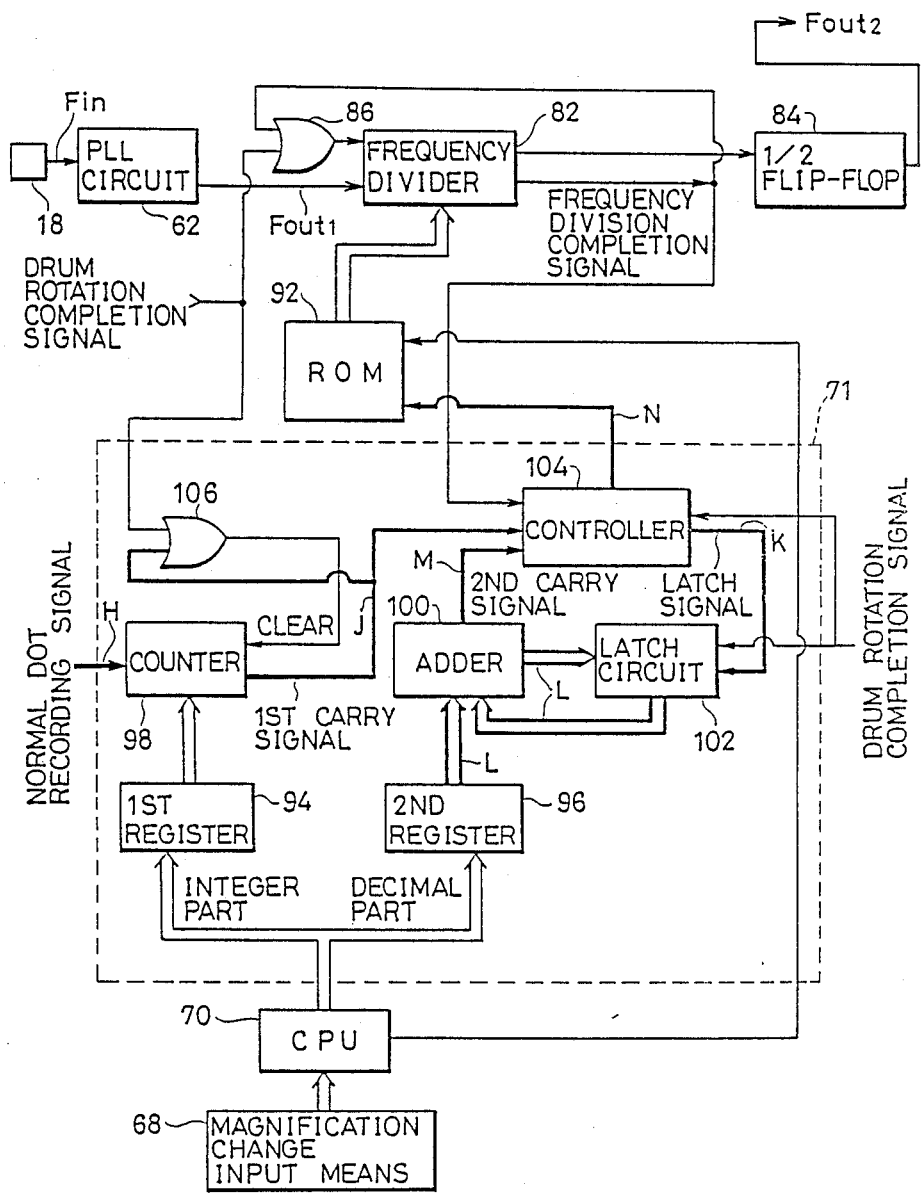
Figure 9:
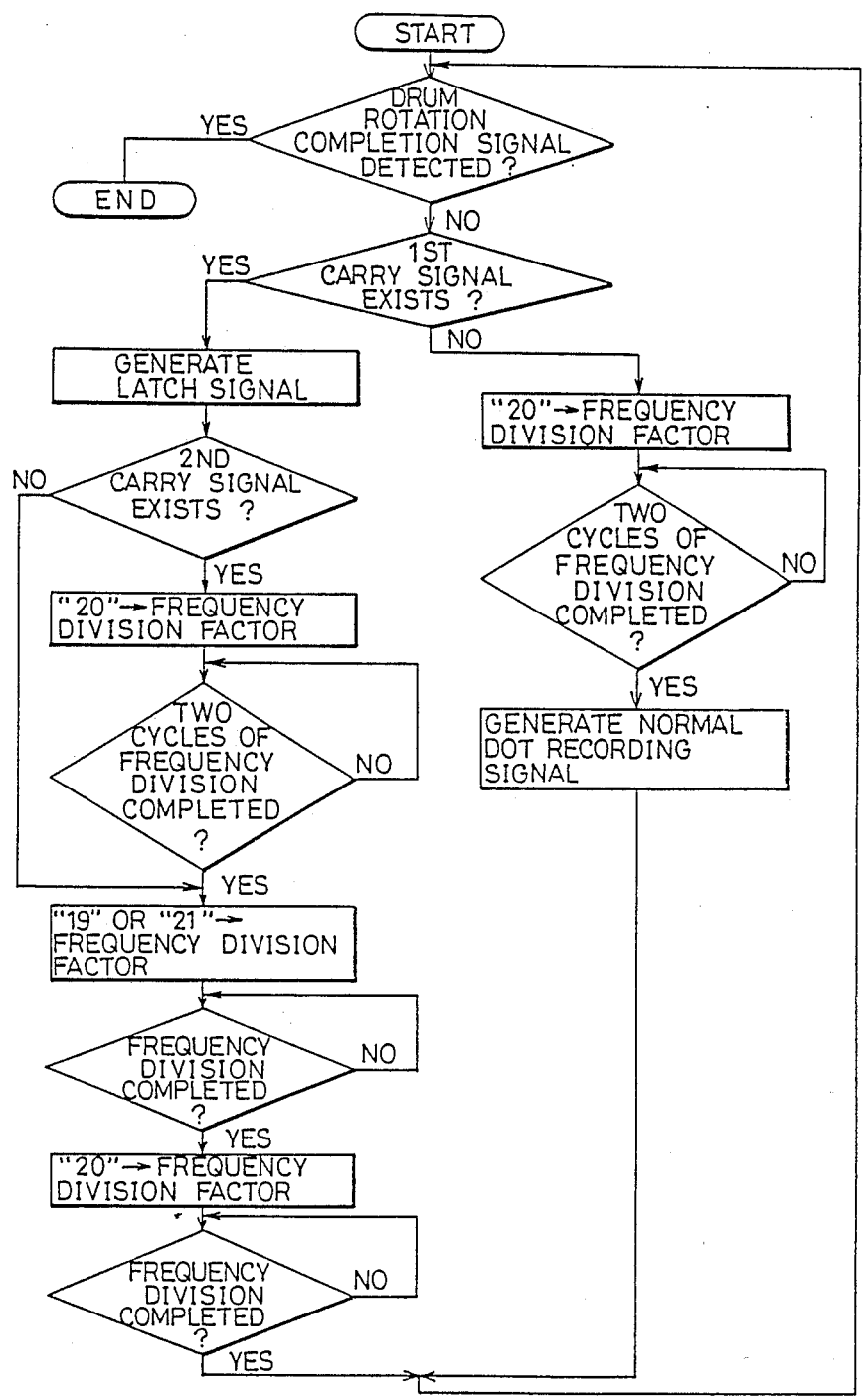
FIG. 9 is a flow chart for explaining operation of a controller 104.

In the following, operation of the controller 104 will be described, with reference to FIG. 9 showing the flow chart thereof and FIG. 5C. The controller 104 outputs a normal dot recording signal each time one dot of the standard size is recorded. The counter 98 has a count incremented by one each time the normal dot recording signal is detected (shown by the line H in FIG. 5C). The counter 98 outputs a first carry signal when the content of the counter 98 is equal to the content of the first register 94 (shown by the line J). The controller 104 changes the frequency division factor of the frequency divider 82 to "19" or "21" corresponding to reduction or expansion when the first carry signal is supplied thereto. If the first carry signal is not provided, the controller 104 sets again the frequency division factor to 20 for the frequency divider 82. When the frequency division factor of the frequency divider 82 is changed to "19" or "21", one dot of a changed size is recorded.

On this occasion, the below described corrections are carried out. The controller 104 sends a latch signal to the latch circuit 102 each time it receives the first carry signal (indicated by the line K). The adder 100 adds the content of the second register 96 to the content of the latch circuit 102 each time the latch signal is supplied to the latch circuit 102 (expressed by the arrows L). When the total of the addition exceeds "1", the adder 100 outputs a second carry signal to the controller 104 (indicated by the line M).

If the second carry signal is supplied, the controller 104 records one dot of the standard size before recording a dot of the changed size (shown by the line N). This procedure is shown in FIG. 10. FIG. 10 (a) shows each pulse of an image forming clock signal. In the case shown in the figure, one dot of a changed size is recorded for 2.48 dots of the standard size. At this time, "2" is inputted to the first register 94 and "0.48" is inputted to the second register 96. Thus, the counter 98 repeats counting as shown in FIG. 10 (b). On the other hand, the adder 100 repeats addition as shown in FIG. 10 (c). FIG. 10 (d) shows the moments of output of the second carry signal dependent on the results of the adder 100. FIG. 10 (e) indicates whether a dot of the standard size or a correction dot is to be recorded actually. The mark represents a dot of the standard size and the mark o represents a correction dot for changing the Δ magnification.

The decimal part of the total of the addition of the adder 100 is set in the adder 100 by the latch circuit 102 so as to be used for a subsequent addition. With respect to the standard dot not requiring such corrections, the frequency division factor "20" corresponding to the standard condition is set in the frequency divider 82. Thus the controller 104 carries out the above described operation and each time the drum completes its rotation, the controller 104 terminates a turn of the operation.

The completion of each rotation of the drum is detected by sensing the starting point pulse signal of the rotary encoder 18. The frequency divider 82 and the counter 98 are cleared by the drum rotation completion signal through the OR circuit 86 and 106, respectively. The latch circuit 102 is also cleared by the drum rotation completion signal. And the operation of the controller 104 starts with the drum rotation completion signal.

Thus, a scanning line of a magnification changed in the main scanning direction is recorded. At the same time the recording head 20 is moved in the subscanning direction by means of the transport motor 76 and the screw shaft 78 at a predetermined speed and with precision. As a result, an image having a magnification changed in the main scanning direction is recorded on the film 14.

In the above described embodiment, the frequency division factors of the frequency divider 82 for reduction and expansion are changed by "1" with respect to a standard value. However, they are not limited to this value. In addition, a RAM may be used in place of the ROM 92 for example and each time the CPU 70 evaluates magnification change information, evaluated frequency division factors may be set directly in the RAM.

Further, correction dots may be mixed in arbitrary positions on one scanning line and, in such a case, the same magnification changing effect can be obtained. However, practically it will be the best way to evenly mix the correction dots as in the above described embodiment.

In the above described embodiment, arbitrary magnification change by the operator was described. However the present invention is not limited thereto. For example, the present invention is applicable to correction means for compensating an error in finishing precision of a drum diameter. In addition, needless to say, an apparatus of the present invention can be also used as means for correcting an error in the recording size caused by various thickness of a photosensitive material to be used.

For example, an error of a beam spot diameter caused by an error in finishing precision of a drum diameter changes the length in the main scanning direction of a recorded image. Accordingly, in order to correct such an error, a recording unit such as a ROM to which a correction amount necessary for changing a magnification has been inputted before shipment of the product may be connected to the CPU 70. Thus, the CPU 70 can perform evaluation for image magnification change information by adding a magnification change amount set by the user operator to a magnification change amount by correction stored in the ROM or the like.

In addition, the above described embodiment is applied to a laser recording apparatus of a rotary drum system. In the case of the rotary drum system, main scanning and exposure are effected by rotation of the recording drum. However, the present invention is also applicable to an image recording apparatus of a flying spot system as described in Japanese Patent Laying-Open No. 67277/1981 for example. According to this system, a rotational polygon mirror or a galvanomirror, or a rotating mirror or the like is used to change a direction of irradiation of a laser beam.

Furthermore, the present invention is not limited to the above described embodiment. For example, magnification change information may be calculated by using a desk calculator or the like, without using the magnification change ratio input means 68. This is possible because the conditions for changing the magnification of the image are very simple. In this case, the magnification change information may be set directly in the registers.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image recording apparatus with a variable magnification for forming an image on photosensitive material based on image data prepared in advance, by scanning on said photosensitive material in a main scanning direction and in a subscanning direction intersecting with said main scanning direction, comprising:
    image recording means for holding said photosensitive material and forming said image on said photosensitive material based on said image data;
    image recording signal generating means connected to said image recording means, for storing said image data and generating an image recording signal for forming said image based on said image data;
    magnification signal generating means for generating a predetermined magnification signal to form said image with a desired magnification; and
    image recording signal adjusting means connected to said image recording signal generating means and said magnification signal generating means, for adjusting said image recording signal in response to said magnification signal,
    said image being formed by a plurality of dots,
    said image recording signal adjusting means comprising
        standard dot size defining means for defining a standard dot size of said plurality of dots in said main scanning direction, and
        dot size changing means for defining size of part of said plurality of dots in said main scanning direction in response to said magnification signal, whereby
    the size of said image is adjusted to said desired magnification.

2. An image recording apparatus with a variable magnification in accordance with claim 1, wherein
    said standard dot size defining means comprises
    reference clock signal generating means for generating a reference clock signal corresponding to displacement in space of said photosensitive material, and
    multiplying means for multiplying said reference clock signal.

3. An image recording apparatus with a variable magnification in accordance with claim 2, wherein
    said dot size change means comprises
    frequency dividing means for frequency-dividing said multiplied clock signal by a plurality of predetermined frequency division factors, and
    frequency division factor change means for changing the frequency division factors of said frequency dividing means in response to said magnification signal during said main scanning.

4. An image recording apparatus with a variable magnification in accordance with claim 1, wherein
    said dot size changing means sets the size of part of said plurality of dots to a predetermined second dot size different from the standard dot size.

5. An image recording apparatus with a variable magnification in accordance with claim 4, wherein
    said dot size changing means includes variable dot size determining means for determining said standard dot size in response to said magnification signal.

6. An image recording apparatus with variable magnification in accordance with claim 5, wherein
    said image forming clock generating means comprises
    variable frequency dividing means connected to said reference signal generating means, for frequency-dividing said reference signal by a plurality of predetermined different frequency division factors and generating said image forming clock signal, said plurality of different frequency division factors including at least a predetermined first frequency division factor for obtaining said first frequency, and magnification change frequency division factor determining means connected to said magnification signal generating means and said variable frequency dividing means, for selecting the frequency division factor of said variable frequency dividing means from said plurality of different frequency division factors in response to said magnification signal.

7. An image recording apparatus with a variable magnification in accordance with claim 4, wherein
said standard dot size defining means comprises reference signal generating means for generating a reference signal having a reference frequency for defining the size of said plurality of dots in said main scanning direction.

8. An image recording apparatus with a variable magnification in accordance with claim 7, wherein
said image recording means comprises main scanning signal generating means for generating a main scanning signal in response to the main scanning, and
said reference signal generating means comprises reference synchronizing signal generating means for generating a reference synchronizing signal which synchronizes with the main scanning, in response to said main scanning signal.

9. An image recording apparatus with a variable magnification in accordance with claim 8, wherein
said image recording means includes a rotary drum having a rotating shaft and being rotatable about said rotating shaft while holding said photosensitive material thereon,
said main scanning signal generating means includes a rotary encoder provided on said rotating shaft, for detecting a rotating position of said rotary drum and generating a signal having a frequency corresponding to the rotating speed, and
said reference synchronizing signal generating means includes frequency multiplying means for multiplying the frequency of said main scanning signal and generating said reference synchronizing signal.

10. An image recording apparatus with a variable magnification in accordance with claim 9, wherein
said dot size changing means comprises image forming clock signal generating means connected to said magnification signal generating means and said frequency multiplying means, for generating an image forming clock signal including a predetermined first frequency and a predetermined second frequency different from said first frequency, in response to said magnification signal based on said reference signal,
said standard dot size is defined by a wavelength of the image formation clock corresponding to said first frequency and said second dot size is defined by a wavelength of the image forming clock corresponding to said second frequency.

11. An image recording apparatus with a variable magnification in accordance with claim 10, wherein
said image formation clock generating means comprises
variable frequency dividing means connected to said frequency multiplying means, for frequency-dividing said reference signal by a frequency division factor selected from a plurality of different frequency division factors and generating said image forming clock signal, said plurality of different frequency division factors including a predetermined first frequency division factor for obtaining said first frequency and a predetermined second frequency division factor for obtaining said second frequency, and
variable frequency division adjusting means connected to said magnification signal generating means and said variable frequency dividing means, for outputting a frequency division factor signal for adjusting the frequency division factor of said variable frequency dividing means during the main scanning, in response to said magnification signal.

12. An image recording apparatus with a variable magnification in accordance with claim 11, wherein
a scanning line formed by one main scanning operation for said image includes a predetermined number of dots,
said variable frequency division adjusting means comprises
dot number ratio detecting means for detecting a ratio between the number of dots of said standard dot size in said scanning line of said image which is being formed, and the number of dots of said second dot size, and
dot size selecting means connected to said dot number ratio detecting means, for setting the respective sizes of said plurality of dots to either said standard dot size or said second dot size.

13. An image recording apparatus with a variable magnification in accordance with claim 7, wherein
said dot size changing means comprises image formation clock generating means connected to said magnification signal generating means and said reference signal generating means, for generating an image forming clock signal having a predetermined first frequency and a second frequency different from the first frequency in response to said magnification signal based on said reference signal, and
said standard dot size is defined by a wavelength of the image formation clock corresponding to said first frequency and said second dot size is defined by a wavelength of the image formation clock corresponding to said second frequency.

14. An image recording apparatus with a variable magnification in accordance with claim 13, wherein said image formation clock generating means comprises
variable frequency dividing means connected to said reference signal generating means, for frequency-dividing said reference signal by a plurality of predetermined different frequency division factors and generating said image forming clock signal, said plurality of frequency division factors including a predetermined first frequency division factor for obtaining said first frequency and a predetermined second frequency division factor for obtaining said second frequency, and
variable frequency division adjusting means connected to said magnification signal generating means and said variable frequency dividing means, for outputting a frequency division factor signal for adjusting the frequency division factor of said variable frequency dividing means during the main scanning, in response to said magnification signal.

15. An image recording apparatus with a variable magnification in accordance with claim 14, wherein
a scanning line formed by one main scanning operation for said image includes a predetermined number of dots, and said variable frequency division adjusting means comprises
  dot number detecting means for detecting the number of dots of said standard dot size in said scanning line of said image which is being formed, and the number of dots of said second dot size, and
  dot size selecting means connected to said dot number detecting means, for setting the respective sizes of said plurality of dots to either said standard dot size or said second dot size.

16. An image recording apparatus with a variable magnification in accordance with claim 14, wherein
  a scanning line formed by one main scanning operation for said image includes a predetermined number of dots,
  said variable frequency division adjusting means comprises
    dot number ratio detecting means for detecting a ratio between the number of dots of said standard dot size in said scanning line of said image which is being formed, and the number of dots of said second dot size, and
    dot size selecting means connected to said dot number ratio detecting means, for setting the respective sizes of said plurality of dots to either said standard dot size or said second dot size.

17. An image recording apparatus with a variable magnification in accordance with claim 16, wherein
  said dot size selecting means comprises frequency division factor selecting means for selecting either said first frequency division factor or said second frequency division factor.

18. An image recording apparatus with a variable magnification in accordance with claim 17, wherein
  said magnification signal generating means comprises
    magnification input means for inputting said desired magnification,
    dot number ratio determining means for determining a ratio between the number of dots of said standard dot size in said scanning line and the number of dots of said second dot size in response to said magnification signal, and
    frequency dividing number ratio recording means for recording a ratio between the number of frequency divisions by said first frequency division factor and the number of frequency divisions by said second frequency division factor during formation of said scanning line, thereby to obtain said ratio of the numbers of dots.

19. An image recording apparatus with a variable magnification in accordance with claim 18, wherein
  said frequency number ratio recording means comprises
    integer part storing means for storing an integer part of said ratio of the numbers of frequency divisions, and
    decimal part storing means for storing a decimal part of said ratio.

20. An image recording apparatus with a variable magnification in accordance with claim 19, wherein
  said dot number ratio detecting means comprises
    counter means for counting the number of frequency divisions by said first frequency division factor in response to said frequency division factor signal, and
    first comparing means for detecting a predetermined relation between a content of said counter means and a content of said integer part storing means and generating a first carry signal.

21. An image recording apparatus with a variable magnification in accordance with claim 20, wherein
  said first comparing means comprises means for detecting a coincidence of the content of said counter means and the content of said integer part storing means and generating the first carry signal.

22. An image recording apparatus with a variable magnification in accordance with claim 21, wherein
  said variable frequency dividing means comprises
    a frequency divider connected to said reference signal generating means and said variable frequency division adjusting means, for frequency-dividing said reference signal by the frequency division factor defined by said frequency division factor signal in response to said frequency division factor signal and generating said image formation clock signal,
    means for detecting a completion of the frequency division of the reference signal by said frequency division factor and generating a frequency division completion signal, and
    frequency divider clearing means for clearing said frequency divider in response to said frequency division completion signal.

23. An image recording apparatus with a variable magnification in accordance with claim 22, wherein
  said variable frequency division adjusting means comprises
    fundamental selection means for one of the frequency dividing values connected to said variable frequency dividing means and said dot number ratio detecting means, for outputting a fundamental signal of the frequency division factor in response to said frequency division completion signal and said first carry signal, and
    frequency value correcting means connected to said fundamental selection means, for outputting said frequency division factor signal in response to said fundamental signal.

24. An image recording apparatus with a variable magnification in accordance with claim 23; wherein
  said frequency division factor correcting means comprises
    means for outputting a predetermined latch signal in response to said fundamental signal of the frequency division factor,
    addition means for performing predetermined addition processing in response to said latch signal,
    second comparing means for detecting a predetermined relation between the result of the addition of said addition means and a predetermined value and generating a second carry signal, and
    frequency division factor signal output means connected to said second comparing means and said fundamental selection means, for outputting said frequency division factor signal in response to said fundamental signal of the frequency division factor and said second carry signal.

25. An image recording apparatus with a variable magnification in accordance with claim 24, wherein
  said addition means comprises
    a latch circuit for storing a decimal part of the result of the addition of said addition processing, and an adder for adding a content of said decimal part storing means to a content of said latch circuit, and said second comparing means generates said second carry signal when said result of the addition is larger than 1.

26. An image recording apparatus with variable magnification for forming an image on a photosensitive material based on image data prepared in advance, by scanning on said photosensitive material in a main scanning direction and in a subscanning direction intersecting with said main scanning direction, comprising:

reference clock signal generating means for generating a reference clock signal corresponding to displacement in space on the side of said photosensitive material, multiplying means for multiplying said reference clock signal, frequency dividing means for frequency-dividing said multiplied clock signal, image recording means for holding said photosensitive material and forming said image on said photosensitive material based on said image data, image recording signal generating means connected to said image recording means, for storing said image data and generating an image forming signal for the formation of the image based on said image data, magnification input means for inputting a desired magnification for forming said image with a desired magnification change, operation means connected to said magnification input means, for processing magnification data for changing a frequency division factor of said frequency dividing means based on the magnification, and frequency division factor change controlling means for controlling change of a predetermined frequency division factor applied to said frequency dividing means based on said magnification data during said scanning.

27. An image recording apparatus with a variable magnification in accordance with claim 26, wherein said magnification data includes a numerical value having an integer part and a decimal part, said frequency division factor change controlling means comprises integer part processing means for processing said integer part, decimal part processing means for processing said decimal part, control means for controlling said integer part processing means and said decimal part processing means, and storing means connected to said control means, for storing a predetermined frequency division factor and supplying said predetermined frequency division factor to said frequency dividing means.

28. An image recording apparatus with a variable magnification in accordance with claim 27, wherein said operation means defines a first frequency division factor stored in said storing means and a second frequency division factor different from said first frequency division factor stored in said storing means.

29. An image recording apparatus with a variable magnification in accordance with claim 28 wherein said integer part processing means comprises a first register for storing said integer part, counter means for counting the number of frequency divisions of said frequency dividing means by said first frequency division factor, and counter means clear means clearing said counter means, said counter means detecting coincidence between a content of said counter means and a content of said first register means and generating a first carry signal.

30. An image recording apparatus with a variable magnification in accordance with claim 27, wherein said predetermined frequency division factor is any of a plurality of different frequency division factors, said plurality of different frequency division factors include a predetermined first frequency division factor, a second frequency division factor combined with said first frequency division factor, and a third frequency division factor different from said second frequency division factor and combined with said first frequency division factor.

31. An image recording apparatus with a variable magnification in accordance with claim 30, wherein said magnification includes an expansion magnification for expanding said image or a reduction magnification for reducing said image, said operation means selects said first frequency division value and said second frequency division value corresponding to said expansion magnification and selects said first frequency division value and said third frequency division value corresponding to said reduction magnification.

32. An image recording apparatus in accordance with claim 31, wherein said integer part processing means comprises a first register for storing said integer part, counter means for counting the number of frequency divisions of said frequency dividing means by said first frequency division factor and counter means clear means clearing said counter means, said counter means detecting coincidence between a content of said counter means and a content of said first register means and generating a first carry signal.

33. An image recording apparatus with a variable magnification in accordance with claim 32, wherein said counter means clear means clears said counter means in response to said first carry signal.

34. An image recording apparatus with a variable magnification in accordance with claim 33, wherein said image is formed by a plurality of main scanning operations in said main scanning direction and subscanning operations in said subscanning direction, and said counter means clear means detects an end of said main scanning operations and clears said counter means.

35. An image recording apparatus with a variable magnification in accordance with claim 34, wherein said control means outputs a latch signal in response to said first carry signal.

36. An image recording apparatus with a variable magnification in accordance with claim 35, wherein said decimal part processing means comprises second register means for storing said decimal part, addition means for adding a stored content of said second register means repetitively in response to said latch signal, the resultant of addition of said addition means including a resultant integer part and a resultant decimal part, said resultant decimal part being stored in said addition means, and addition means clear means for clearing said stored content of said addition means.

37. An image recording apparatus with a variable magnification in accordance with claim 36, comprising a latch circuit for storing said resultant decimal part, and an adder for performing said addition, said adder generating a second carry signal when said resultant integer part is 1 or more.

38. An image recording apparatus with a variable magnification in accordance with claim 37, wherein said addition means clear means comprises latch means clear means for detecting an end of said main scanning operation and clearing a content of said latch means.

39. An image recording apparatus with a variable magnification in accordance with claim 38, wherein said control means controls said storing means in response to said first carry signal and said second carry signal, whereby said frequency division factor of said frequency dividing means is changed.

40. An image recording apparatus with a variable magnification in accordance with claim 39, wherein said storing means includes a ROM.

* * * * *